US012392358B1

(12) United States Patent
Lim et al.

(10) Patent No.: US 12,392,358 B1
(45) Date of Patent: Aug. 19, 2025

(54) AUTOMATED HIGH PRESSURE COMPRESSOR ROTOR ASSEMBLY

(71) Applicant: RTX Corporation, Farmington, CT (US)

(72) Inventors: Chye Leng Lim, Singapore (SG); Pedro C. Diaz Buxo, Palm Beach Gardens, FL (US); Jiawei Edwin Sum, Singapore (SG); Weicheng Abram Li, Singapore (SG); Jia Liang Ang, Singapore (SG); Wen Rong Cheong, Singapore (SG)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/802,018

(22) Filed: Aug. 13, 2024

(51) Int. Cl.
  *F04D 29/64* (2006.01)
  *B25J 15/00* (2006.01)
  *F04D 19/00* (2006.01)

(52) U.S. Cl.
  CPC ........ *F04D 29/644* (2013.01); *B25J 15/0052* (2013.01); *F04D 19/002* (2013.01)

(58) Field of Classification Search
  CPC .... F04D 29/644; F04D 19/002; B25J 15/0052
  See application file for complete search history.

(56) References Cited

U.S. PATENT DOCUMENTS

| | | | | |
|---|---|---|---|---|
| 8,517,687 B2 * | 8/2013 | Benjamin | ............... | F01D 5/066 416/198 A |
| 9,205,933 B2 | 12/2015 | Oberoi et al. | | |
| 11,557,944 B2 * | 1/2023 | Briscoe | ................. | H02K 1/276 |
| 12,149,133 B2 * | 11/2024 | Briscoe | ................. | H02K 15/03 |
| 2018/0287439 A1 * | 10/2018 | Degner | ............... | H02K 1/2766 |
| 2022/0239204 A1 * | 7/2022 | Briscoe | ................. | B25J 9/0084 |
| 2023/0155458 A1 * | 5/2023 | Briscoe | ................. | B25J 11/005 29/598 |

FOREIGN PATENT DOCUMENTS

| | | | | | |
|---|---|---|---|---|---|
| CN | 108789464 | A | * | 11/2018 | .......... B25J 15/0066 |
| CN | 109323854 | A | * | 2/2019 | ........... B65G 47/904 |
| CN | 208887908 | U | * | 5/2019 | ........... B65G 47/904 |
| CN | 110303338 | A | * | 10/2019 | ............ B23P 19/007 |
| CN | 108789464 | B | | 11/2020 | |
| CN | 116572008 | A | * | 8/2023 | |
| EP | 3428390 | A1 | * | 1/2019 | ............. F01D 5/025 |

* cited by examiner

*Primary Examiner* — Bayan Salone

(74) *Attorney, Agent, or Firm* — CANTOR COLBURN LLP

(57) ABSTRACT

An automated assembly system for two or more rotary components of a gas turbine engine includes a stacking station at which the two or more rotary components are stacked along a stacking axis and a press system selectably movable between a retracted position spaced apart from the stacking axis and a press position at the stacking axis. The press system is configured to exert a downward force on the two or more rotary components at the stacking station to engage a first rotary component of the two or more rotary components to a second rotary component of the two or more rotary components. A robot is configured to sequentially stack the two or more rotary components along the stacking axis.

20 Claims, 12 Drawing Sheets

AUTOMATED HIGH PRESSURE COMPRESSOR ROTOR ASSEMBLY

BACKGROUND

Exemplary embodiments of the present disclosure pertain to the art of gas turbine engine assembly, and in particular to assembly of a high pressure compressor (HPC) assembly of a gas turbine engine.

A compressor rotor assembly, such as an HPC rotor assembly, includes a combination of rotors, shafts, hub and the like that are assembled along a stacking axis. The assembly has tight roundness and squareness requirements, having tolerances in the range of <0.000X inches.

The rotor assembly is typically a manual process requiring at least 12 hours to accomplish, starting with the heating of the components, and with manual stacking of the components, installing of adapters for a hydraulic press operation, and room temperature cooling of the assembly. The art would welcome an assembly process that would improve reliability and repeatability of the assembly process and reduce assembly time and man hours required to accomplish the assembly.

BRIEF DESCRIPTION

In one exemplary embodiment, an automated assembly system for two or more rotary components of a gas turbine engine includes a stacking station at which the two or more rotary components are stacked along a stacking axis and a press system selectably movable between a retracted position spaced apart from the stacking axis and a press position at the stacking axis. The press system is configured to exert a downward force on the two or more rotary components at the stacking station to engage a first rotary component of the two or more rotary components to a second rotary component of the two or more rotary components. A robot is configured to sequentially stack the two or more rotary components along the stacking axis.

Additionally or alternatively, in this or other embodiments the press system includes a hydraulic cylinder, a press operably connected to the hydraulic cylinder, and a track along which the press system is selectably movable between the retracted position and the press position.

Additionally or alternatively, in this or other embodiments the track includes a rack operably connected to a pinion of the press system.

Additionally or alternatively, in this or other embodiments a cooling apparatus is operably connected to the press system to accelerate cooling of a rotary component of the two or more rotary components.

Additionally or alternatively, in this or other embodiments the cooling apparatus is configured to direct a flow of cooling air toward the rotary component of the two or more rotary components.

Additionally or alternatively, in this or other embodiments one or more interchangeable grippers are affixed to the robot and are configured to engage a rotary component of the two or more rotary components for movement and stacking of the two or more rotary components.

Additionally or alternatively, in this or other embodiments a gripper of the one or more grippers is configured to engage the rotary component at an internal bore of the rotary component.

Additionally or alternatively, in this or other embodiments the gripper includes three gripper fingers configured to move radially outwardly to engage the internal bore.

Additionally or alternatively, in this or other embodiments one or more ovens are configured to heat at least one rotary component of the two or more rotary components prior to sequentially stacking the two or more rotary components.

Additionally or alternatively, in this or other embodiments one or more sensors are operably connected to the robot to detect one or more conditions of the two or more rotary components.

Additionally or alternatively, in this or other embodiments the two or more rotary components are a high pressure compressor (HPC) rotor assembly.

In another exemplary embodiment, a method of assembly of two or more rotary components of a gas turbine engine includes positioning a first rotary component at a stacking station via operation of a robot, positioning a second rotary component at the stacking station atop the first rotary component via operation of the robot, and operating a press system to exert a downward force on the two or more rotary components at the stacking station to engage a first rotary component of the two or more rotary components to a second rotary component of the two or more rotary components. The press system is selectably movable between a retracted position spaced apart from the stacking axis and a press position at the stacking axis.

Additionally or alternatively, in this or other embodiments the press system is selectably movable along a track between the retracted position and the press position via a rack and pinion arrangement.

Additionally or alternatively, in this or other embodiments cooling of a rotary component of the two or more rotary components is accelerated via a cooling apparatus operably connected to the press system.

Additionally or alternatively, in this or other embodiments the cooling apparatus directs a flow of cooling air toward the rotary component of the two or more rotary components.

Additionally or alternatively, in this or other embodiments one or more interchangeable grippers are installed to the robot to engage a rotary component of the two or more rotary components for movement and stacking of the two or more rotary components.

Additionally or alternatively, in this or other embodiments a gripper of the one or more grippers engages the rotary component at an internal bore of the rotary component.

Additionally or alternatively, in this or other embodiments at least one rotary component of the two or more rotary components is heated prior to sequentially stacking the two or more rotary components.

Additionally or alternatively, in this or other embodiments one or more conditions of the two or more rotary components are detected via one or more sensors operably connected to the robot.

Additionally or alternatively, in this or other embodiments the two or more rotary components are a high pressure compressor (HPC) rotor assembly.

In addition to one or more of the features described above, or as an alternative to any of the foregoing embodiments, . . . .

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
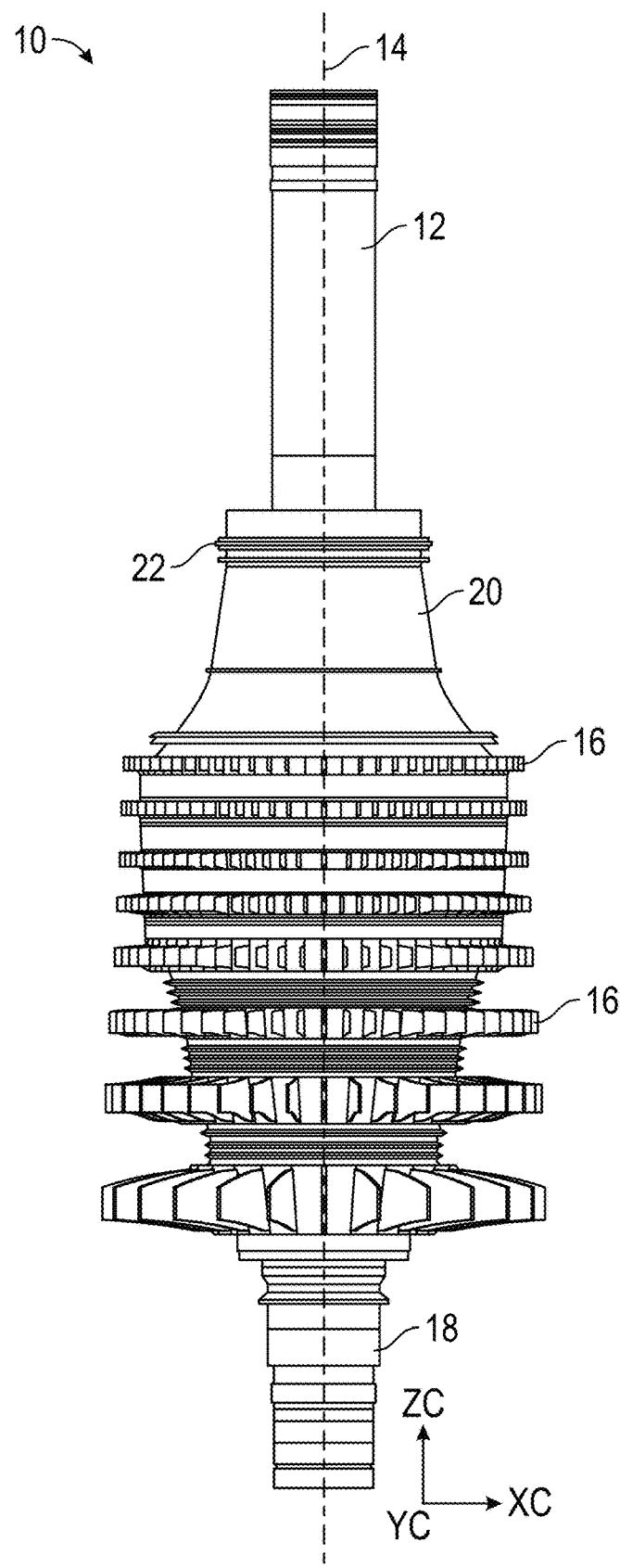
FIG. 1 is a schematic illustration of an embodiment of a high pressure compressor (HPC) rotor assembly.

Referring to FIG. 1, illustrated is an embodiment of a high pressure compressor (HPC) rotor assembly 10 of a gas turbine engine. The HPC rotor assembly 10 includes a tie shaft 12 extending along a stacking axis 14. A plurality of components are arranged along the stacking axis 14 and include a plurality of compressor rotors 16, a front hub 18 and a rear hub 20. One skilled in the art will readily appreciate that the HPC rotor assembly 10 may include additional components not explicitly described herein. The HPC rotor assembly 10 is required to meet criteria for, for example, radial offset, squareness alignment that require a high degree of precision in the assembly process.

Figure 2:
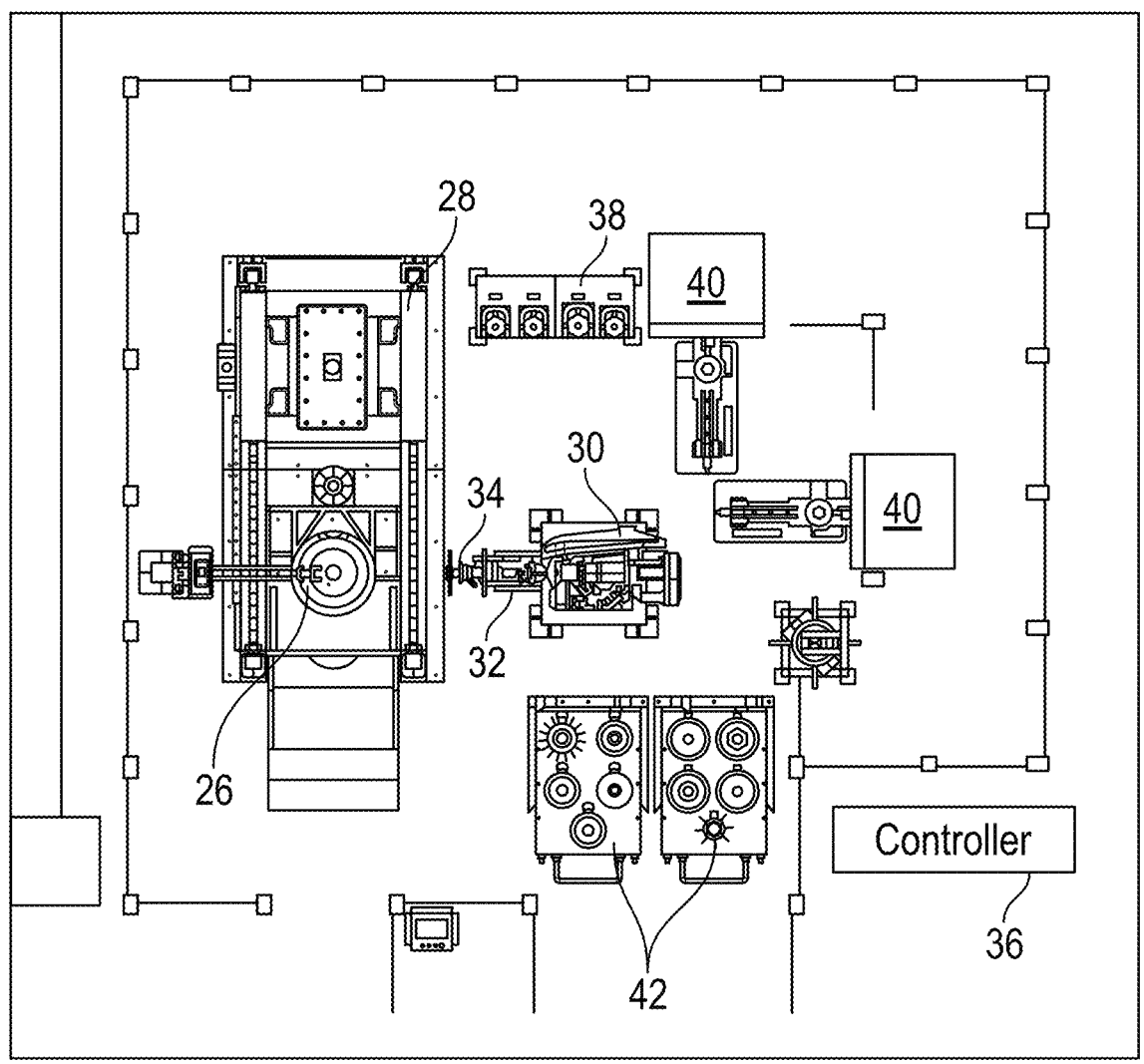
FIG. 2 is a plan view of an embodiment of an automated HPC rotor assembly system.

To accomplish this assembly, disclosed herein is an automated assembly system and method, an embodiment of which is schematically illustrated in FIG. 2. The assembly system 24 includes a stacking station 26 at which the components of the HPC rotor assembly 10 are sequentially stacked and secured along the stacking axis 14. A press system, for example, a hydraulic press system 28 is selectably movable from a retracted position as illustrated in FIG. 2 to a press position over the stacking station 26 to secure the components of the HPC rotor assembly 10 into an assembled state via the application of a downward force along the stacking axis 14. The components of the HPC rotor assembly 10 are moved onto the stacking station via a robot 30, which in some embodiments takes the form of an articulating arm 32 having one or more tools 34 affixed to a distal end of the articulating arm 32 to aid in gripping, moving and otherwise handling the components of the HPC rotor assembly 10. The robot 30 is operably connected to a robot controller 36 which may include programs to provide instructions for movement and other operation of the robot 30 depending on, for example, the configuration of the HPC rotor assembly 10 being assembled. The tools 34 are interchangeable, with different tools 34 being utilized depending on the operation to be performed. Tools 34 utilized the robot 30 may be stored at, for example, a tool rack 38, which is part of the assembly system 24. Additionally, the assembly system 24 may include one or more ovens 40 to heat the components prior to assembly at the stacking station 26, and one or more component trolleys 42 where the components may be staged prior to beginning the assembly process.

Figure 3:
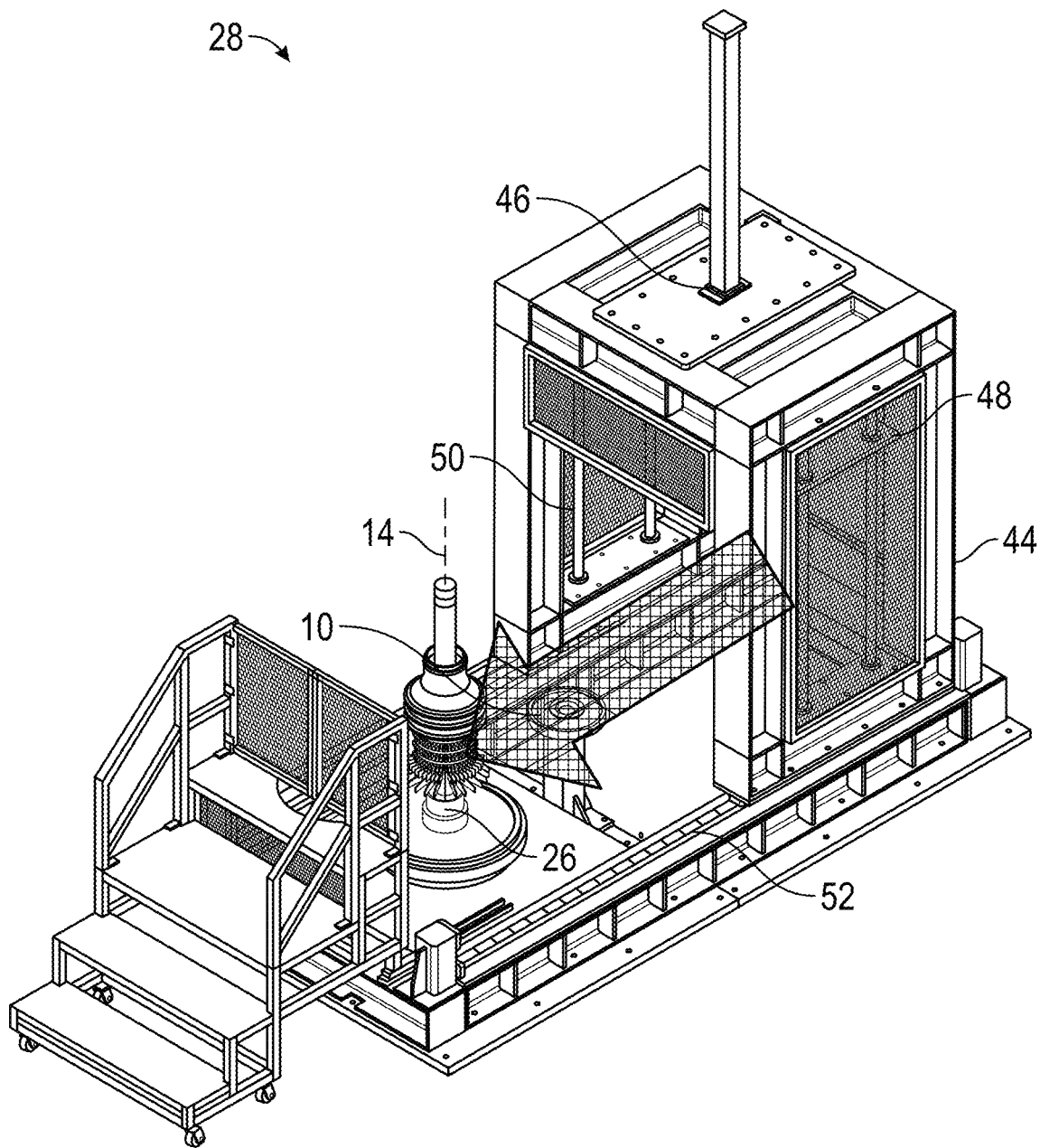
FIG. 3 is a schematic illustration of an embodiment of a stacking station and press system in a retracted position.
Figure 4:
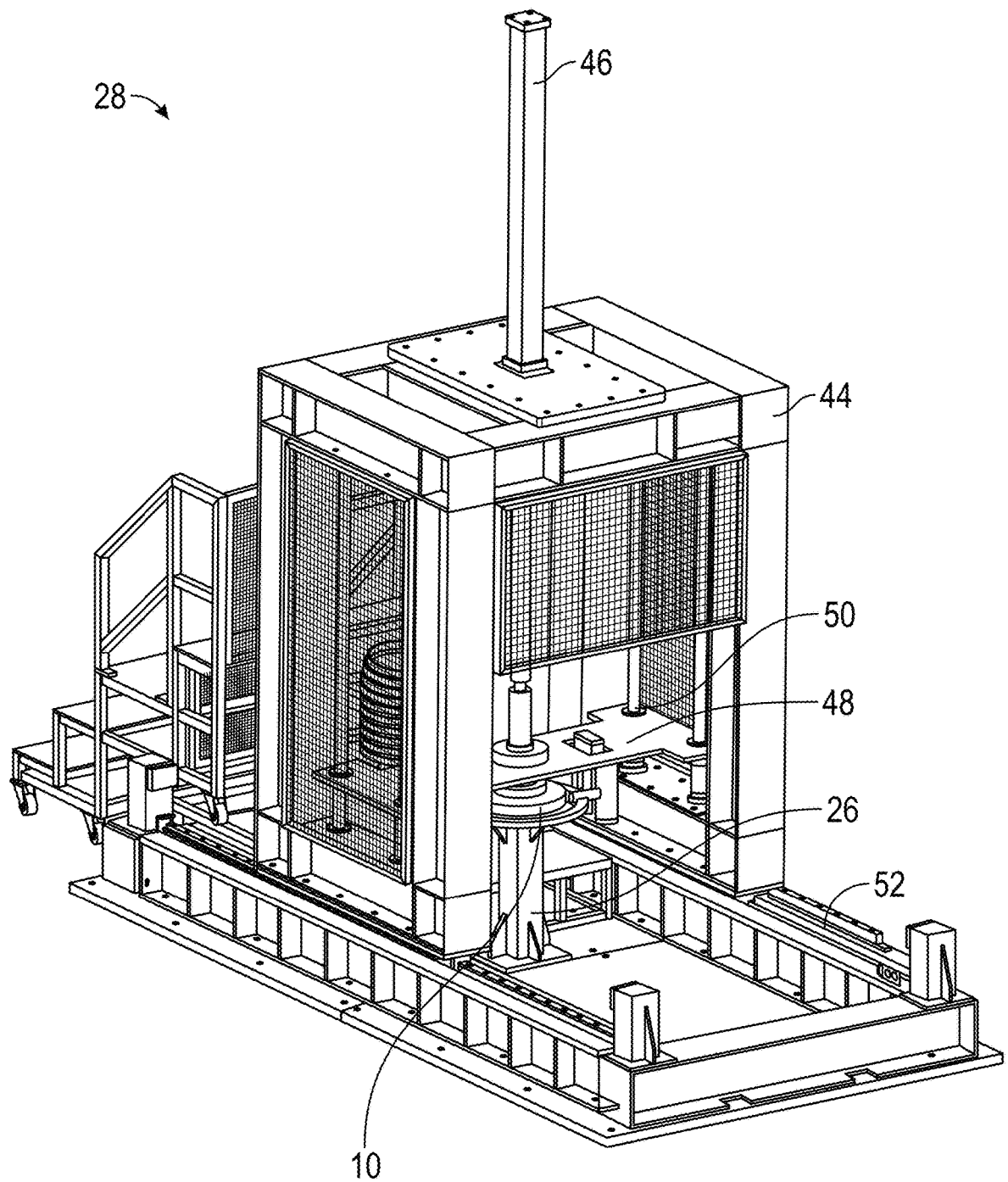
FIG. 4 is a schematic illustration of an embodiment of a stacking station and press system in a press position.
Figure 5:
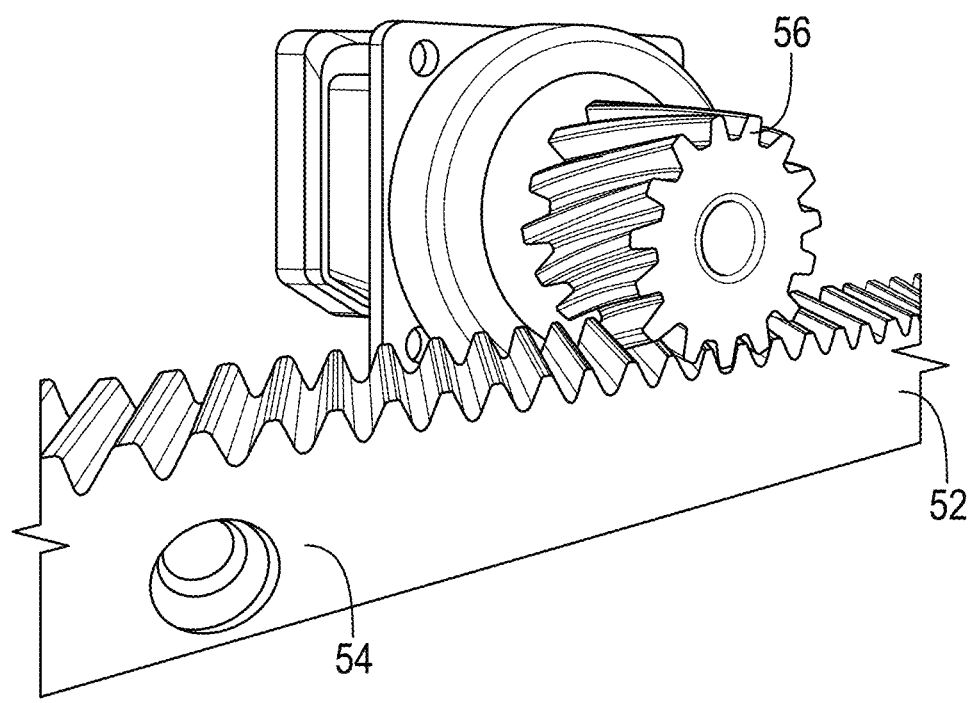
FIG. 5 is an illustration of an embodiment of a rack and pinion of a press system.

Referring now to FIG. 3, illustrated is a stacking station 26 with an HPC rotor assembly 10 illustrated thereat, and an embodiment of a hydraulic press system 28 in the retracted position. The hydraulic press system 28 includes a press frame 44 with a hydraulic cylinder 46 installed in the press frame 44. The hydraulic cylinder 46 drives operation of a press 48 that applies a downward force on components on the HPC rotor assembly 10. One or more press guides 50 are positioned in the press frame 44 to guide movement of the press 48. The hydraulic press system 28 is moveable between the retracted position and the press position illustrated in FIG. 4 via a press track 52, which may include, as illustrated in FIG. 5, a rack 54 along which a pinion 56 of the press frame 44 is driven to drive movement of the press frame 44 along the press track 52. Once in the press frame 44 is driven to the press position, the hydraulic cylinder 46 is operated to drive the press 48 downward to urge the HPC rotor 10 components together.

Figure 6:
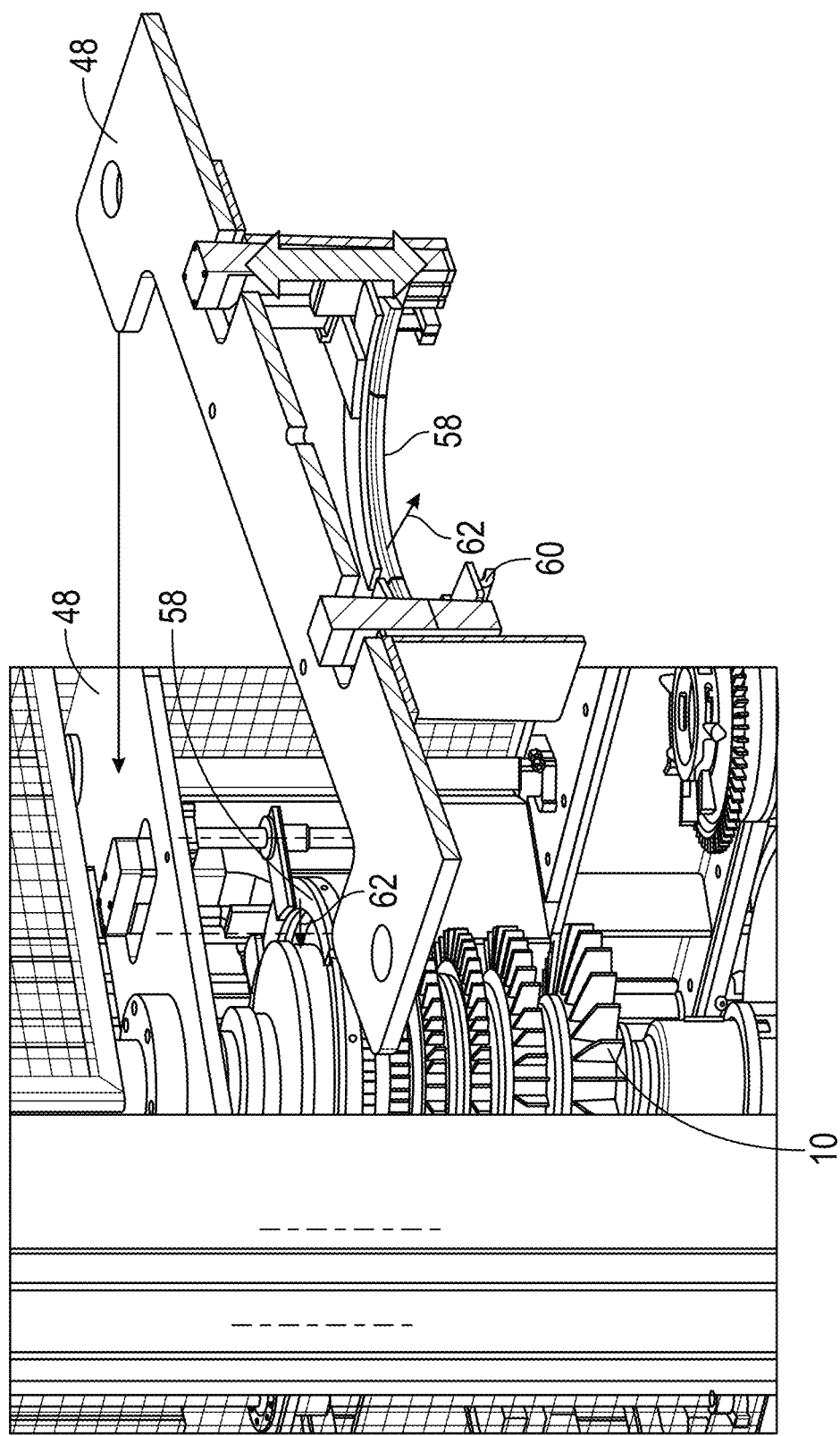
FIG. 6 is an illustration of an embodiment of a cooling apparatus of a press system.

Referring now to FIG. 6, in some embodiments the hydraulic press system 28 includes an integrated cooling apparatus 58. The HPC rotor assembly 10 components are heated to facilitate and enable the assembly of the HPC rotor assembly 10 using, for example, the one or more ovens 40 shown in FIG. 2. Once urged into the assembled condition via the press 48, cooling of the HPC rotor assembly 10 components is accelerated by utilizing the cooling apparatus 58. The cooling apparatus 58 includes one or more nozzles 60 or blowers to direct a flow of cooling air 62 radially inwardly toward the HPC rotor assembly 10 components. This accelerates cooling of the HPC rotor assembly 10 components to allow the remainder of the assembly process to proceed more quickly.

Figure 7:
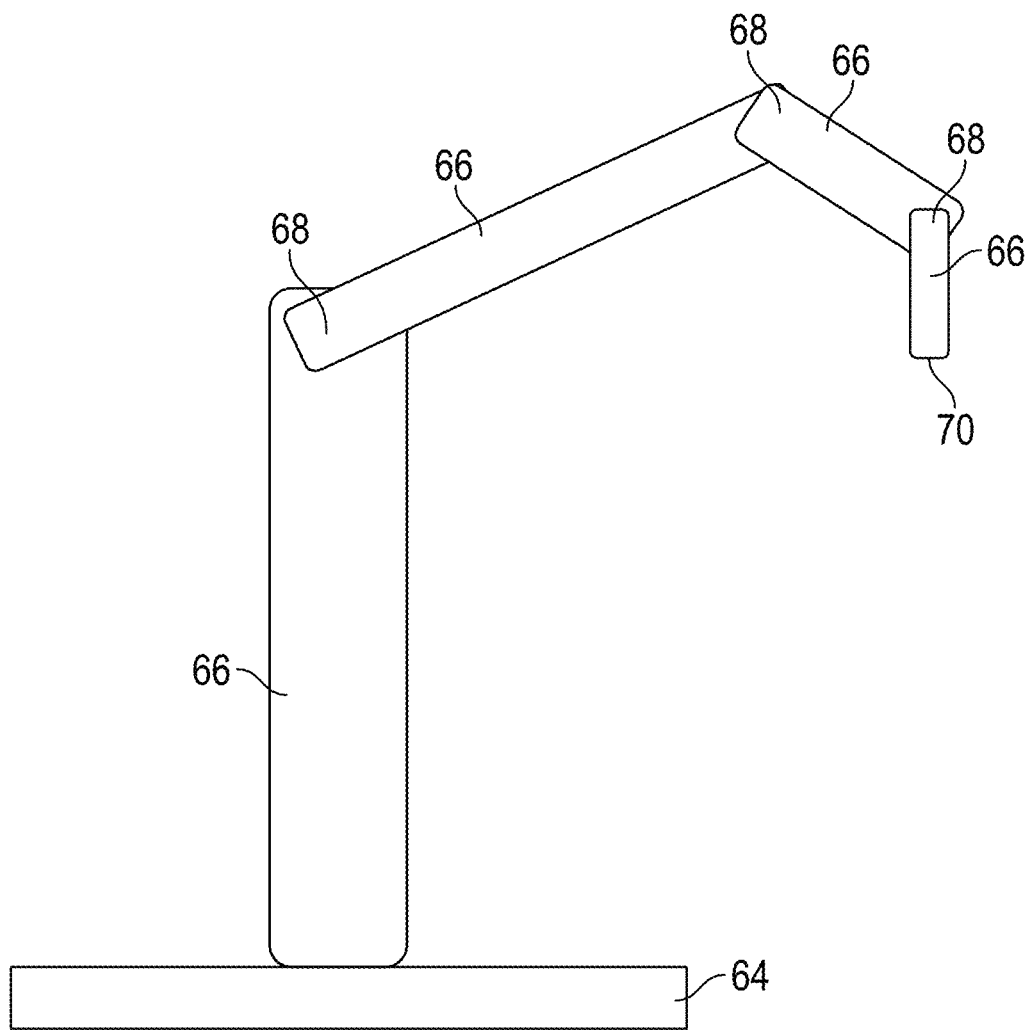
FIG. 7 is a schematic illustration of an embodiment of a robot of an automated HPC rotor assembly system.
Figure 8:
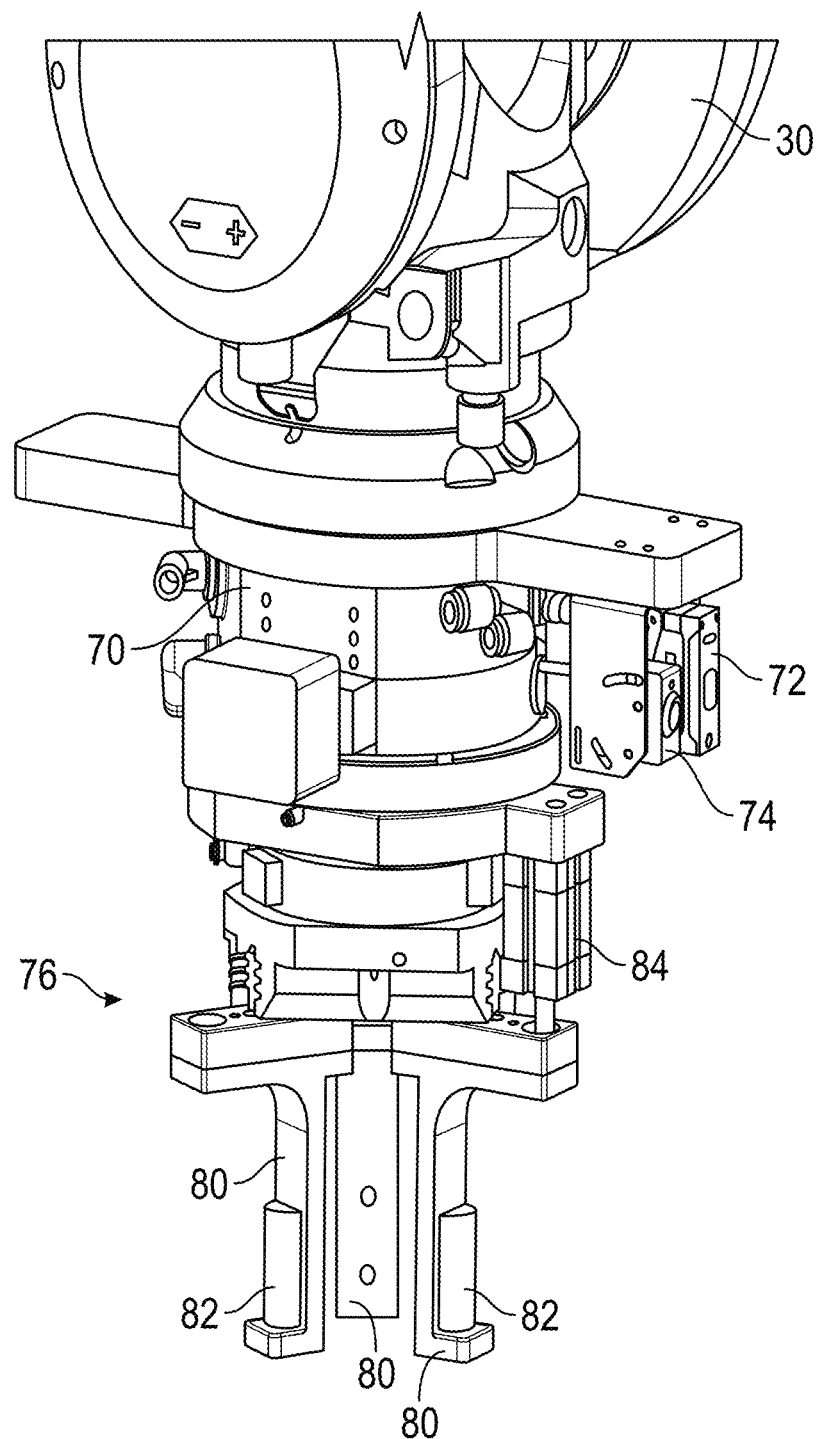
FIG. 8 is an illustration of an embodiment of a gripper of a robot of an automated HPC rotor assembly system.

Referring now to FIG. 7, the robot 30 is operable to move individual HPC rotor assembly 10 components to the stacking station 26 and correctly place the HPC rotor assembly 10 components into the assembly before operation of the hydraulic press system 28. In some embodiments, the robot 30 is rotatably mounted on a robot base 64, and is an articulating arm having a plurality of arm segments 66 rotably connected via a plurality of joints 68. Referring now to FIG. 8, the robot 30 has an arm end 70 to which one or more sensors 72, cameras 74, grippers 76 or other tools or apparatus are attached for operation of the robot 30 and completion of the HPC rotor assembly 10.

The grippers 76 and other tools are interchangeable at the arm end 70 depending on the specific assembly task being performed by the robot 30. For example, the robot 30 may use a different gripper 76 for moving each of the compressor rotors 16, the front hub 18, the rear hub 20 and cooling tube 22 to the stacking station 26. In some embodiments, as previously stated, the grippers 76 and other tools may be stored at the tool rack 38 illustrated in FIG. 2.

Figure 9:
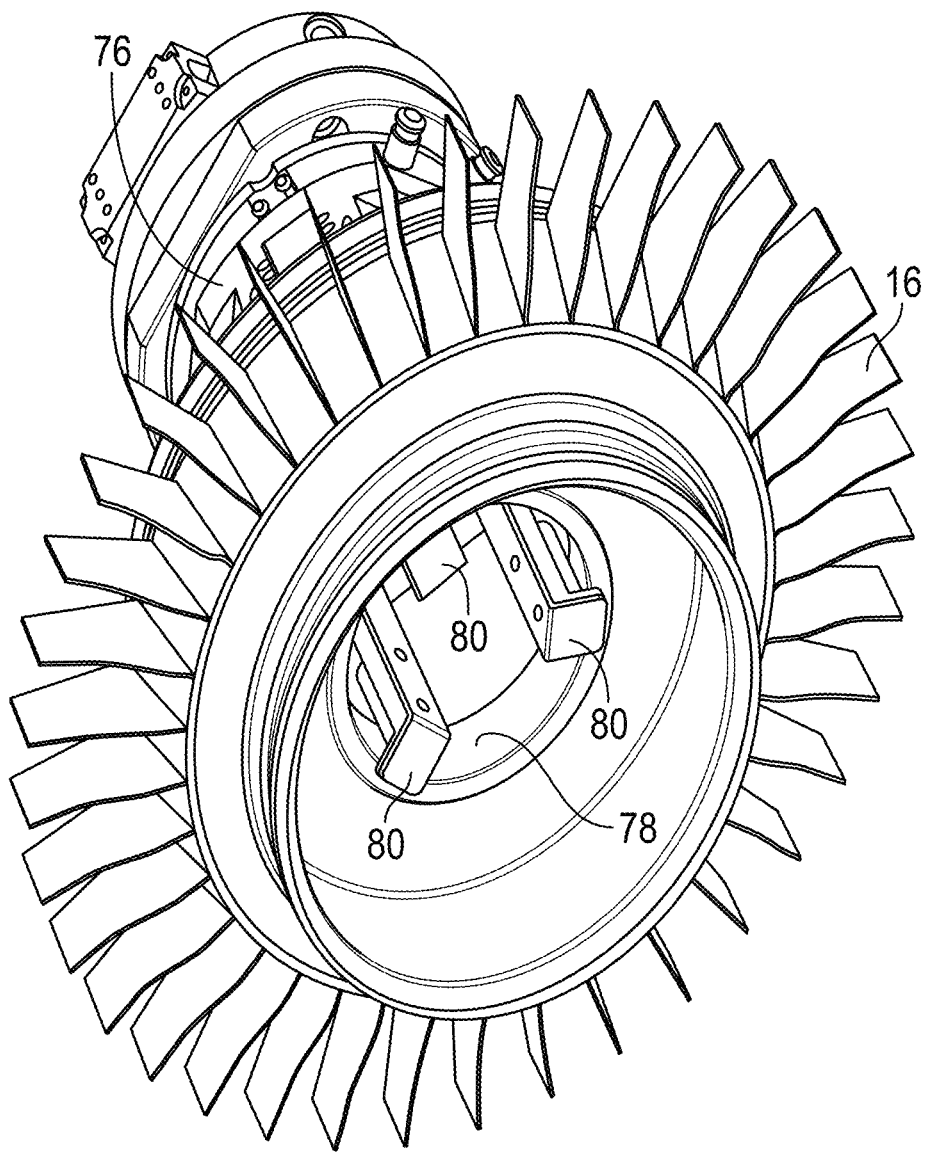
FIG. 9 is an illustration of an embodiment of a gripper engaged with a compressor rotor.

In one embodiment, illustrated in FIGS. 8 and 9, the gripper 76 is configured to engage a component, such as a compressor rotor 16, at an internal bore 78 of the compressor rotor 16. The gripper 76 includes three gripper fingers 80 movable from a disengaged position radially outwardly to an engaged position as illustrated in FIG. 9 to grip the compressor rotor 16. In some embodiments, each of the gripper fingers 80 includes a finger block 82 having a curvilinear profile, which in some embodiments matches a radius of curvature of the internal bore 78, thus improving engagement between the gripper fingers 80 and the internal bore 78. In some embodiments, the finger blocks 82 are replaceable in the case of wear of the finger blocks 82. A stopper cylinder 84 is, in some embodiments, connected to the gripper 76 to selectably lock the gripper 76 in the engaged position to prevent loss of engagement in the event of power failure or the like. As stated, the robot 30 may include one or more sensors 72. These sensors 72 may include, for example, a laser sensor to verify height and/or levelness of the rotor assembly 10 and a temperature sensor to verify a temperature of a heated rotor component after heating in the one or more ovens 40. Additionally, the one or more cameras 74 may be utilized to visually verify correct positioning of the HPC rotor assembly 10 components, such as relative circumferential positioning or "clocking" of the components. Further, the sensors 72 may perform an initial alignment check on the components, prior to operating the hydraulic press system 28 to ensure proper initial alignment of the components, and/or checking the height of installed components after operation of the hydraulic press system 28 operation to ensure that the components are properly seated.

Figure 10:
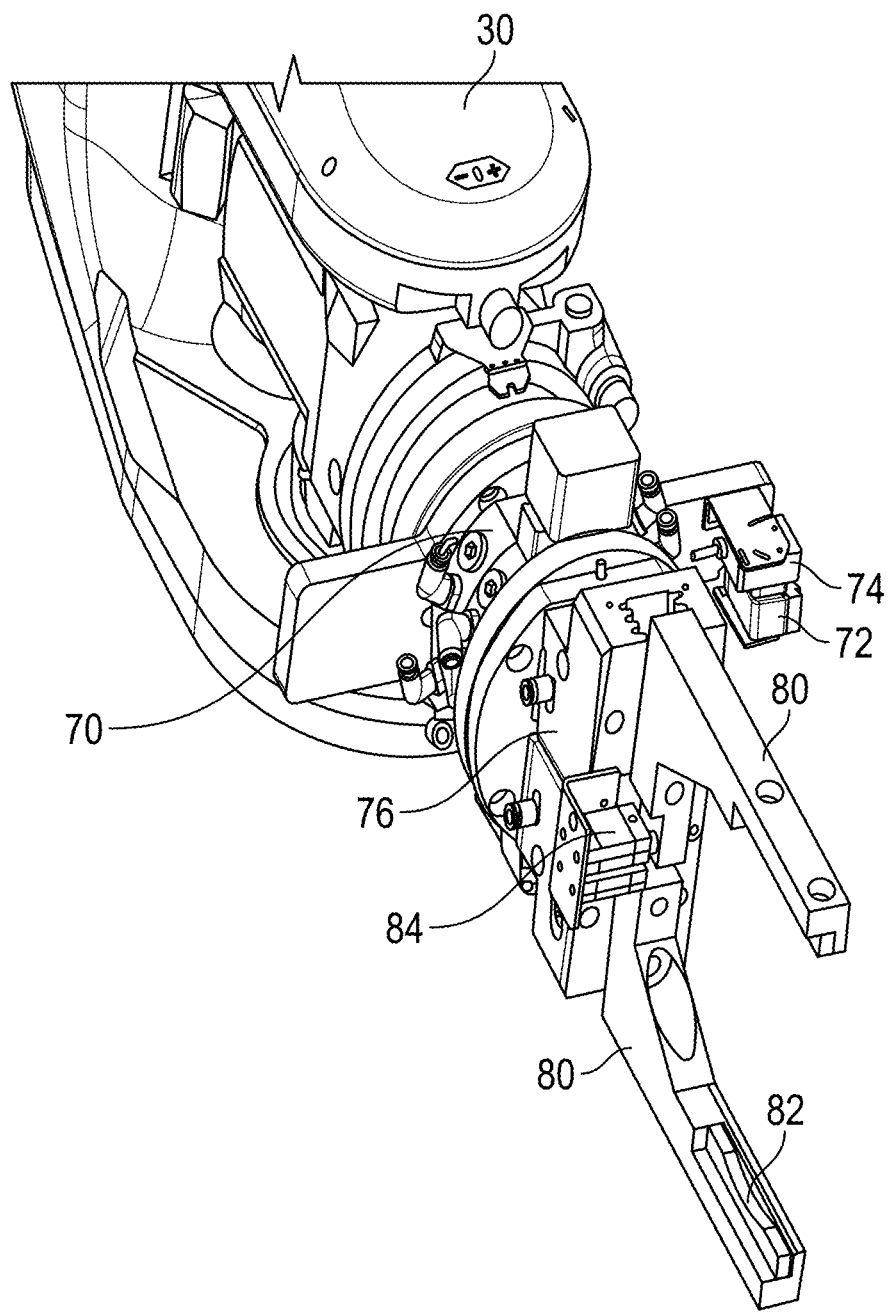
FIG. 10 is an illustration of another embodiment of a gripper of a robot of an automated HPC rotor assembly system.
Figure 11:
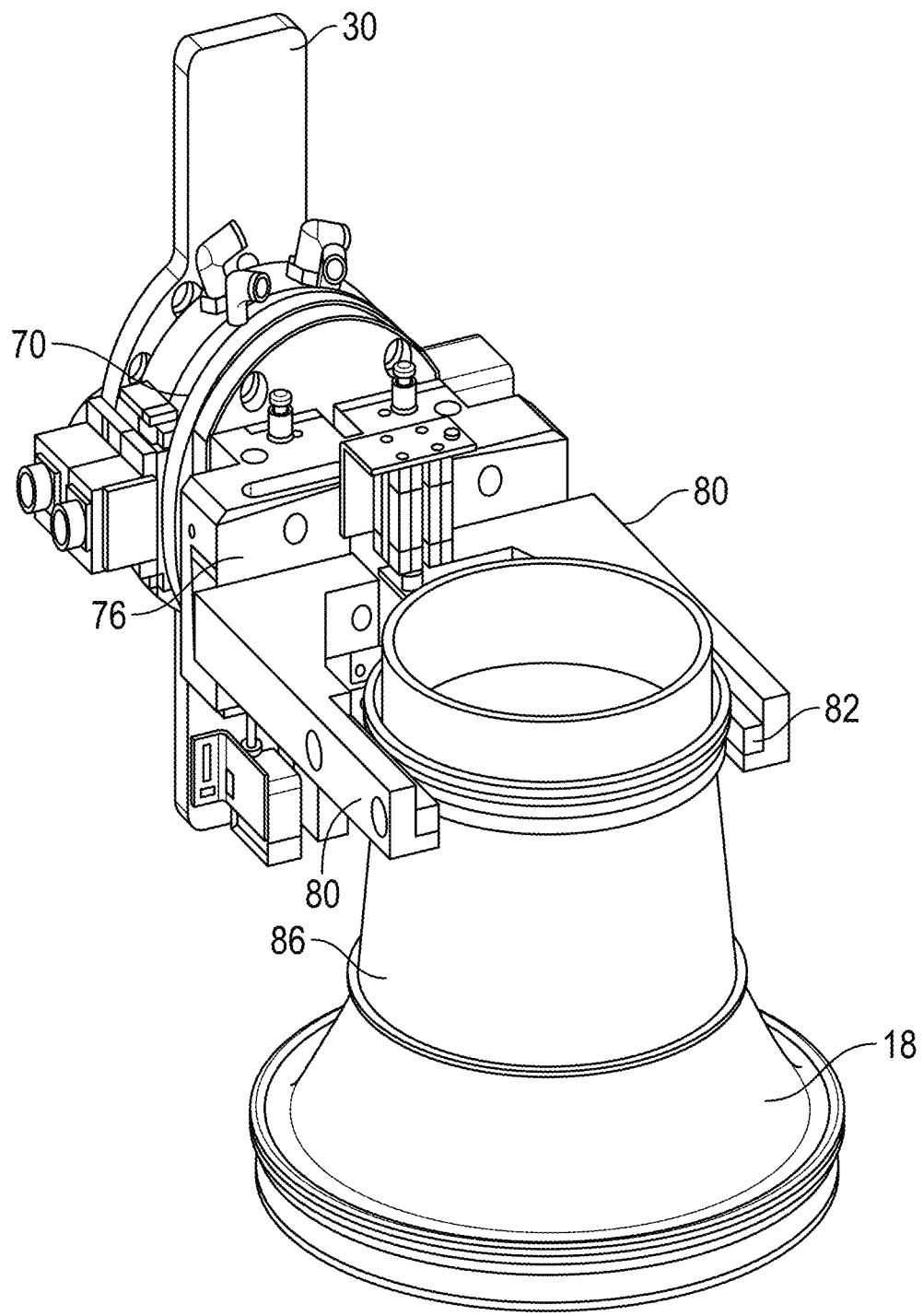
FIG. 11 is an illustration of an embodiment of a gripper engaged with a rotor hub.

In other embodiments, such as illustrated in FIGS. 10 and 11, the gripper 76 is configured to engage a component, such as a rear hub 20, at an external hub surface 86 of the rear hub 20. In this embodiment, the gripper 76 includes two gripper fingers 80, which are configured to move radially inwardly from a disengaged to an engaged position as illustrated in FIG. 11 to engage the external hub surface 86. The gripper fingers 80 include finger blocks 82, which in some embodiments have a V-shaped profile as illustrated in FIG. 10 to improve centering of the rear hub 20.

Figure 12:
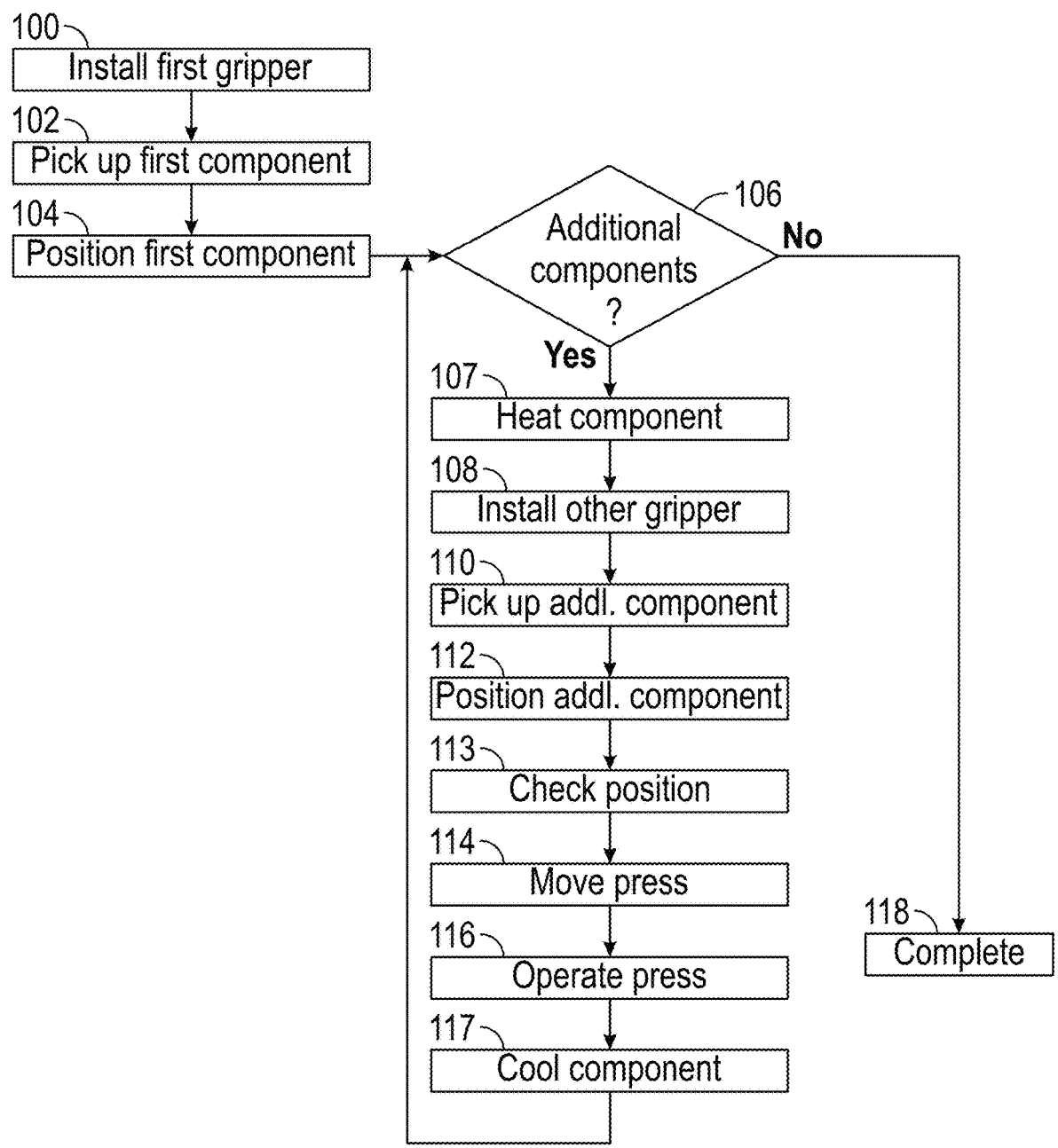
FIG. 12 is an illustration of an embodiment of a method of assembling rotary components of a gas turbine engine.

A method of assembling the HPC rotor assembly 10 utilizing the automated assembly system is schematically illustrated in FIG. 12. At step 100, a first gripper 76 is installed to the arm end 70 by operation of the robot 30. The first gripper 76 is utilized by the robot 30 to pick up a first HPC rotor assembly 10 component at step 102 and place the component at the stacking station 26 at step 104. At step 106, the robot 30 determines whether additional HPC rotor assembly 10 components are to be assembled. If yes, a subsequent HPC rotor assembly 10 component is placed in the oven 40 for heating at step 107. A subsequent gripper 76 is installed to the arm end 70 by operation of the robot 30 at step 108, and the robot 30 picks up the subsequent HPC rotor assembly 10 component at step 110. The component is added to the HPC rotor assembly 10 at the stacking station 26 at step 112. At step 113, a correct position of the component on the rotor stack is verified by the robot 30. The hydraulic press system 28 is moved to the press position at the stacking station 26 at step 114, and the press is operated to engage the component to the HPC rotor assembly 10 at step 116. The component is then cooled by the cooling apparatus 58 at step 117. These steps are repeated for all additional components, and the HPC rotor assembly 10 is completed at step 118.

The use of the automated assembly system and method improves assembly process repeatability and accuracy, while reducing man hours required to accomplish the assembly.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An automated assembly system for two or more rotary components of a gas turbine engine, comprising:
   a stacking station at which the two or more rotary components are stacked along a stacking axis;
   a press system selectably movable between a retracted position spaced apart from the stacking axis and a press position at the stacking axis, the press system configured to exert a downward force on the two or more rotary components at the stacking station to engage a first rotary component of the two or more rotary components to a second rotary component of the two or more rotary components; and
   a robot configured to sequentially stack the two or more rotary components along the stacking axis.

2. The system of claim 1, wherein the press system includes:
   a hydraulic cylinder;
   a press operably connected to the hydraulic cylinder; and
   a track along which the press system is selectably movable between the retracted position and the press position.

3. The system of claim 2, wherein the track comprises a rack operably connected to a pinion of the press system.

4. The system of claim 1 including a cooling apparatus operably connected to the press system to accelerate cooling of a rotary component of the two or more rotary components.

5. The system of claim 4, wherein the cooling apparatus is configured to direct a flow of cooling air toward the rotary component of the two or more rotary components.

6. The system of claim 1, further comprising one or more interchangeable grippers affixed to the robot configured to engage a rotary component of the two or more rotary components for movement and stacking of the two or more rotary components.

7. The system of claim 5, wherein a gripper of the one or more grippers is configured to engage the rotary component at an internal bore of the rotary component.

8. The system of claim 6, wherein the gripper includes three gripper fingers configured to move radially outwardly to engage the internal bore.

9. The system of claim 1, further comprising one or more ovens to heat at least one rotary component of the two or more rotary components prior to sequentially stacking the two or more rotary components.

10. The system of claim 1, further comprising one or more sensors operably connected to the robot to detect one or more conditions of the two or more rotary components.

11. The system of claim 1, wherein the two or more rotary components are a high pressure compressor (HPC) rotor assembly.

12. A method of assembly of two or more rotary components of a gas turbine engine, comprising: positioning a first rotary component at a stacking station along a stacking axis via operation of a robot; positioning a second rotary component at the stacking station atop the first rotary component along the stacking axis via operation of the robot; and operating a press system to exert a downward force on the two or more rotary components at the stacking station to engage a first rotary component of the two or more rotary components to a second rotary component of the two or more rotary components; wherein the press system is selectably movable between a retracted position spaced apart from the stacking axis and a press position at the stacking axis.

13. The method of claim 12, wherein the press system is selectably movable along a track between the retracted position and the press position via a rack and pinion arrangement.

14. The method of claim 12, further comprising accelerating cooling of a rotary component of the two or more rotary components via a cooling apparatus operably connected to the press system.

15. The method of claim 14, wherein the cooling apparatus directs a flow of cooling air toward the rotary component of the two or more rotary components.

16. The method of claim 12, further comprising installing one or more interchangeable grippers to the robot to engage a rotary component of the two or more rotary components for movement and stacking of the two or more rotary components.

17. The method of claim 16, wherein a gripper of the one or more grippers engages the rotary component at an internal bore of the rotary component.

18. The method of claim 12, further comprising heating at least one rotary component of the two or more rotary components prior to sequentially stacking the two or more rotary components.

19. The method of claim 12, further comprising detecting one or more conditions of the two or more rotary components via one or more sensors operably connected to the robot.

20. The method of claim 12, wherein the two or more rotary components are a high pressure compressor (HPC) rotor assembly.

* * * * *